United States Patent [19]

Majima et al.

[11] Patent Number: 4,598,244
[45] Date of Patent: Jul. 1, 1986

[54] SWITCHING REGULATOR

[75] Inventors: Shinichi Majima; Atsushi Ogawa, both of Yokohama, Japan

[73] Assignee: Kabushiki Kaisha Toshiba, Tokyo, Japan

[21] Appl. No.: 596,049

[22] Filed: Apr. 2, 1984

[30] Foreign Application Priority Data

Mar. 31, 1983 [JP] Japan .................................. 58-55961
Mar. 31, 1983 [JP] Japan .................................. 58-56090

[51] Int. Cl.⁴ .............................................. G05F 1/10
[52] U.S. Cl. ..................................... 323/351; 323/282
[58] Field of Search ............... 323/282, 284, 285, 286, 323/287, 351

[56] References Cited

U.S. PATENT DOCUMENTS 4,513,360  4/1985  Ikenoue et al. .................... 363/20

FOREIGN PATENT DOCUMENTS 2056853  5/1972  Fed. Rep. of Germany ...... 323/282
991395  1/1983  U.S.S.R. ............................. 323/282

OTHER PUBLICATIONS

"Application Report for Switching Regulator," Published by Texas Instruments Asia Limited.
"Audio/Radio Handbook," Published by National Semiconductor Corporation, 1980.

Primary Examiner—Peter S. Wong
Assistant Examiner—Judson H. Jones
Attorney, Agent, or Firm—Finnegan, Henderson, Farabow, Garrett & Dunner

[57] ABSTRACT

A switching regulator which operates with low power consumption, which includes an input power supply source for supplying an unregulated DC voltage; an output network for supplying a load with a regulated DC voltage, the output network being coupled to a first terminal of the input power supply source; a switching element coupled to a second terminal of the input power supply source; an inductor connected between the output network and the switching element; the inductor, the output network and the switching element being connected in series relationship across the input power supply source; a first capacitor connected between the inductor and the first end of the input power supply source in parallel with the output network for smoothing the current flowing through the output network; a transistor connected at its collector-emitter path between said switching element and the first terminal of the input power supply source in parallel with the series circuit of the output network and the inductor, the transistor being connected in reverse polarity with regard to the input power supply source, and circuit means for biasing the base of the transistor, the base biasing circuit means being connected between the first terminal of the input power supply source and the switching element.

5 Claims, 6 Drawing Figures

SWITCHING REGULATOR

BACKGROUND OF THE INVENTION

This invention relates to a switching regulator, and more particularly to a chopper type switching regulator which is able to operate with very low power consumption.

Recently, small-sized, high efficiency power sources have been used to provide low voltage and high current for semiconductor circuits, particularly integrated circuits. A switching regulator is especially useful in power sources for providing loads with stable DC power. Many efforts have been made to improve the efficiency of the switching regulator.

A switching regulator is known which utilizes an inductive kick from an inductor or a choke coil for smoothing the load current at a moment when current flowing through the choke coil has been cut off, and circulates the current produced by the inductive kick into a load as the load current. In a conventional switching regulator, the current circulation is affected by using a diode. The conventional switching regulator, however, has problems in that the power loss in the regulating circuit is relatively large because of the diode forward voltage drop of about 0.7 V (volt). The forward voltage drop is a problem for improving the power consumption efficiency in switching regulators, especially for small-sized equipments.

An example of the conventional switching regulator is shown in FIG. 1 and is discussed in connection with FIG. 2 below in the Description of the Preferred Embodiment.

SUMMARY OF THE INVENTION

The subject invention relates to novel switching regulator which is able to operate with low power consumption.

These and other objects are achieved in the switching regulator of the invention which includes an input power supply source for supplying a load with a regulated DC voltage, an output network being coupled to a first end of the input power supply source, a switching element coupled to a second end of the input power supply source, an inductor connected between the output network and the switching element, the inductor, the output network and the switching element being connected in series across the input power supply source, a first capacitor connected between the inductor and the first end of the input power supply source in parallel with the output network for smoothing the current flowing through the output network together with said inductor, a transistor connected at its collector-emitter path between said switching element and the first end of the input power supply source in parallel with the series circuit of the output network and the inductor, the transistor being connected in reverse polarity with regard to the input power supply source, and circuit means for biasing the base of the transistor, the base biasing circuit means being connected between the first end of the input power supply source and the switching element.

Additional objects, advantages, and features of the present invention will further become apparent to persons skilled in the art from a study of the following description and of the accompanying drawings, in which:

DESCRIPTION OF THE PREFERRED EMBODIMENTS

Figure 1:
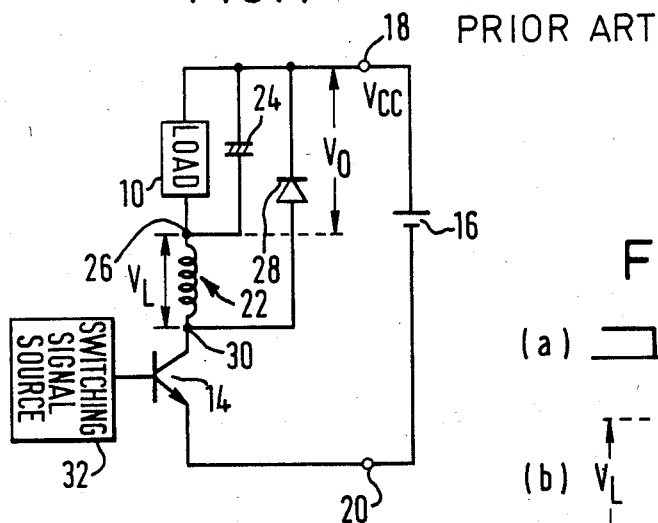
FIG. 1 is a circuit diagram of a conventional switching regulator.

The present invention will now be described in detail with reference to the accompanying drawings. Throughout the drawings like reference numerals and letters are used to designate like or equivalent elements for the sake of simplicity of explanation.

Referring now to FIG. 1, there is shown a conventional switching regulator. The switching regulator shown in FIG. 1 is well known as a so-called chopper type switching regulator. A load 10, an inductor or choke coil 12 and a switching transistor 14 are connected in series. The series circuit is connected across a power supply source 16 which has prescribed unregulated DC voltage Vcc. The load 10 is connected to a first terminal 18 of the power supply source 16 while the switching transistor 14 is connected to a second terminal 20, which can be at some reference potential of the power supply source 16. The choke coil 12 and capacitor 24 form a smoothing circuit 22 for load current flowing through the load 10. Capacitor 24 is connected between the first terminal 18 and connection point 26 which is between the load 10 and the choke coil 12. That is, the capacitor 24 is connected across the load 10. Further, a diode 28 is connected between the first terminal 18 and a connection point 30 between the collector terminal of the switching transistor 14 and the choke coil 12. Diode 28 is connected in reverse-biased direction in regard to the polarity of the power supply voltage Vcc and is connected across both the load 10 and the choke coil 12. The switching transistor 14 is connected at its base terminal to a prescribed switching signal source 32.

Figure 2:
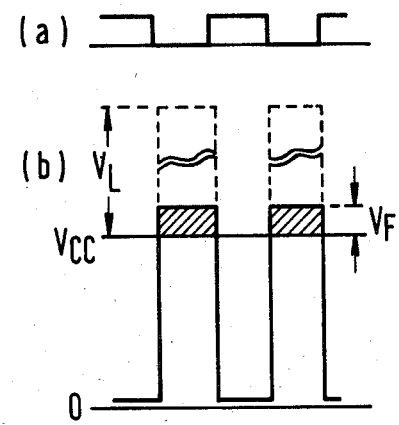
FIG. 2 is a waveform diagram illustrative of operation of the conventional switching circuit apparatus shown in FIG. 1.
Figure 2:
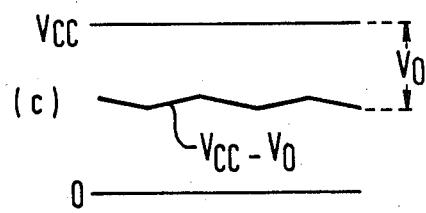

A switching pulse signal with a prescribed duty cycle, as shown in FIG. 2(a), from the switching signal source 32 is applied to the base terminal of the switching transistor 14 so that transistor 14 is switched on and off at the frequency of the switching signal. While the switching transistor 14 is turned on, the choke coil 12 is energized due to the current flowing through the series circuit of load 10, coil 12 and transistor 14. At the moment the switching transistor 14 is turned off, the current flowing through this series circuit is cut off. The electric energy of the choke coil 12 causes a high voltage $V_L$ known as an inductive kick across the choke coil 12. Since the high voltage $V_L$ is induced in a direction to be added to the power supply voltage Vcc, the potential at the connection point 30 becomes higher than the power supply voltage Vcc as shown by the broken lines in FIG. 2(b), thus causing diode 28 to be turned on. Accordingly, the diode 28 causes a current due to the inductive kick to flow into the load 10 while the switching transistor 14 remains de-energized.

FIG. 2(c) shows a voltage waveform at the connection point 26 in FIG. 1. The voltage on the connection point 26 bears a value of Vcc−Vo, where Vo is the voltage drop across the load 10. The voltage Vcc−Vo gradually increases and decreases to a slight extent during the turn-on and the turn-off periods respectively of the switching transistor 14 as shown in FIG. 2(c) in accordance with the time constant of the smoothing circuit 22.

With the above conventional switching regulator, however, there is a loss due to the forward voltage drop $V_F$ (about 0.7 V in case of silicon transistors), as indicated by the hatched portions in FIG. 2(b) across the diode 28 in the forward-biased direction. Therefore, such a conventional switching regulator has a relatively large power loss. The large power loss becomes a serious problem especially in switching regulators for low voltage use as required by ICs and the like.

Figure 3:
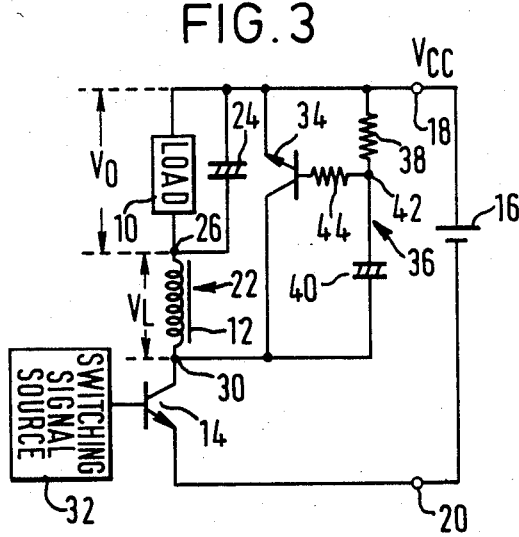
FIG. 3 is a circuit diagram of an embodiment of the switching regulator circuit according to the present invention.

Referring now to FIG. 3, there is shown the circuit diagram of one embodiment of a chopper type switching regulator constructed according to the present invention. In FIG. 3, an output network applied across load 10, an inductor or choke coil 12 and a first transistor which is switching transistor 14 are connected in series. The series circuit is connected across a power supply source 16 with a prescribed unregulated DC voltage Vcc. The load 10 in the series circuit is connected across the output network to a first terminal 18 of the power supply source 16 while the switching transistor 14 is connected to a second terminal 20 of the power supply source 16 which can be at some reference potential. The choke coil 12 and capacitor 24 form a smoothing circuit 22 for the load current flowing through the load 10. Capacitor 24 is connected between the first terminal 18 and a connection point 26 which is between the choke coil 12 and the load 10. In other words, the first capacitor 24 is connected across the load 10. The first transistor, switching transistor 14, is connected at its base terminal to a prescribed switching signal source 32.

Further, a second transistor, which is current circulating transistor 34, is connected between the power supply terminal 18 and a connection point 30 between the collector terminal of the switching transistor 14 and the choke coil 12. Transistor 34 is connected in a reverse-biased direction with regard to the polarity of the power supply voltage Vcc. The current circulating transistor 34 is connected across both the load 10 and the choke coil 12. A biasing circuit 36 is connected to the base terminal of the current circulating transistor 34 which includes a first resistor 38 and a second capacitor 40 connected in series between the power supply terminal 18 and the connection point 30. The base terminal of the current circulating transistor 34 is connected to a connection point 42 between the resistor 38 and the second capacitor 40 through a second resistor 44.

The switching pulse signal as shown in FIG. 2(a) from the switching signal source 32 is applied to the base terminal of transistor 14 so that the switching transistor 14 is switched on and off at the frequency of the switching signal. When the switching transistor 14 is turned on, the choke coil 12 is energized due to the current flowing through the series circuit, while the second capacitor 40 is also charged by a charging current flowing through the first resistor 38. At the moment the switching transistor 14 is turned off, the current flowing through the series circuit of load 10, choke coil 12 and switching transistor 14 is cut off. At the same time, the inductive energy of choke coil 12 causes a high voltage $V_L$ due to the inductive kick across the choke coil 12.

Figure 4:
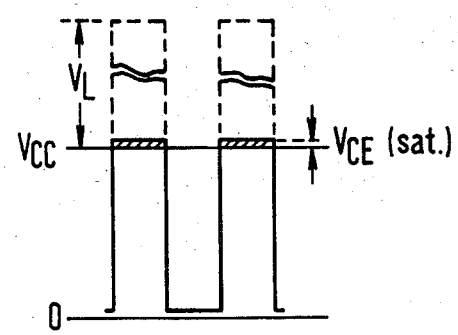
FIG. 4 is a waveform diagram explanatory of operation of the circuit shown in FIG. 3.

Since the high voltage $V_L$ is induced in a direction to be added to the power supply voltage Vcc, the potential at the connection point 30 becomes higher than the power supply voltage Vcc as shown by the broken lines in FIG. 4. Accordingly, the collector-emitter path of the current circulating transistor 34 becomes conductive. On the other hand, a voltage is also induced across the second capacitor 40 additive to the power supply voltage Vcc. That is, the second capacitor 40 serves as a so-called bootstrap capacitor. The potential on the connection point 42 is raised to a voltage higher than the forward base-to-emitter voltage $V_{BE}$ of transistor 34 and the power supply voltage Vcc. Accordingly, the base terminal of the current circulating transistor 34 has a forward base bias potential sufficient to turn on the transistor due to the bootstrap voltage across the second capacitor 40. Thus, the current circulating transistor 34 is turned on due to the voltage caused by the inductive kick of the choke coil 12 and the bootstrap operation of the second capacitor 40. Therefore, the current circulating transistor 34 causes a current to flow into the load 10 while the switching transistor 14 remains de-energized.

Since the current circulating transistor 34 as it is turned on is saturated, a collector-to-emitter voltage $V_{CE}$(sat.) of the transistor in saturation state (indicated by the hatched portions in FIG. 4) has a small value of about 0.2 V. This results in a much smaller loss than the loss due to the conventional switching regulators utilizing diodes as shown in FIG. 1. The switching regulator according to the present invention is highly effective at low voltage operation as required by ICs in particular.

Figure 5:
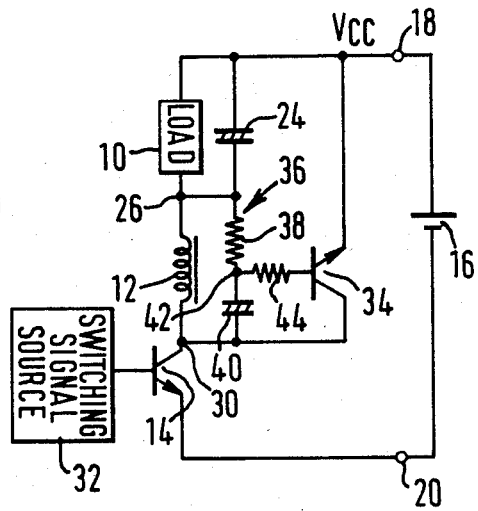
FIGS. 5 and 6 are circuit diagrams respectively showing other embodiments of the present invention.

Referring now to FIG. 5, there is shown a modification of the circuit arrangement of FIG. 3, in which the biasing circuit 36 for the base terminal of the current circulating transistor 34 is connected across only the choke coil 12. Thus, the charging current for the second capacitor 40 flows through the load 10 when the switching transistor 14 is turned on. This serves to utilize the charging current as a part of the load current so that the efficiency of power consumption is better than for the circuit arrangement of FIG. 3.

Figure 6:
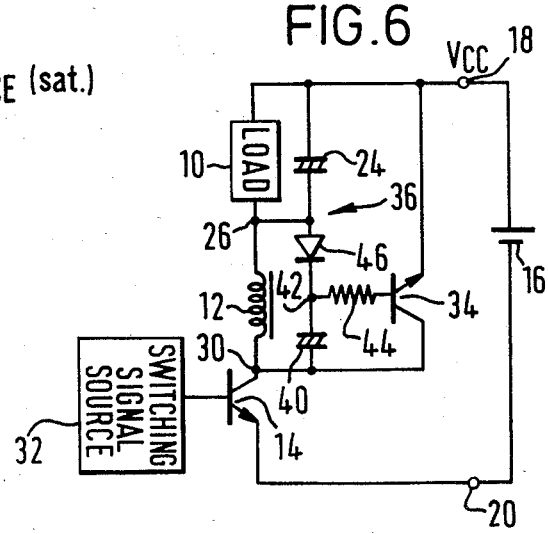

Referring now to FIG. 6, there is shown a modification of the circuit arrangement of FIG. 5, in which a diode 46 is substituted for the first resistor 38 of FIG. 5 in a forward-biased direction in regard to the polarity of the power supply voltage Vcc. With this arrangement, almost all of the current discharged by the second capacitor 40 is supplied as a base current for the current circulating transistor 34 without flowing through the diode 46. This serves to limit the power loss in the second capacitor 40 to quite a small amount.

The present invention should not be interpreted as being limited to the described and illustrated embodiments or modifications but various modifications and adaptations may be made without departing from the scope of the invention.

According to the present invention, as described above, it is possible to provide a switching regulator of a simple construction which is able to reliably operate with a low power consumption.

What is claimed is:

1. A switching regulator circuit for applying a regulated DC voltage to a load comprising:

an input power supply source for supplying an unregulated DC voltage;

an output network for supplying the load with a regulated DC voltage, said output network being coupled to a first terminal of said input power supply source;

a switching element coupled to a second terminal of said input power supply source and adapted to respond to a switching signal;

means for storing energy connected between said load and said switching element, said energy storing means, said output network and said switching element being connected in series relationship across said input power supply source;

first capacitive means connected between said energy storing means and said first terminal of said input power supply source in parallel with said output network operating with said energy storing means to smooth the current flowing through said output network;

a transistor connected at its collector-emitter path between said switching element and said first end of said input power supply source in parllel with the series circuit of said output network and said energy storing means, said transistor being connected in reverse polarity with regard to said input power supply source; and circuit means for biasing the base of said transistor, said base biasing circuit means being connected across said means for storing energy between said first end of said input power supply source and said output network.

2. The switching regulator circuit according to claim 1, wherein said energy storing means is an inductor and said capacitive means is a capacitor.

3. The switching regulator circuit according to claim 2, wherein said base biasing circuit means has a second capacitor connected between said switching element and said base of said transistor and means connected between said second capacitor and said output network for charging said second capacitor.

4. The switching regulator circuit according to claim 3, wherein said means connected between said second capacitor and said output network is a resistor.

5. The switching regulator circuit according to claim 3, wherein said means connected between said second capacitor and said output network is a diode connected in forward polarity with regard to said input power supply source.

* * * * *